United States Patent [19]

Nabae

[11] 4,238,823
[45] Dec. 9, 1980

[54] INVERTER APPARATUS

[75] Inventor: Akira Nabae, Nagaoka, Japan

[73] Assignee: Tokyo Shibaura Denki Kabushiki Kaisha, Japan

[21] Appl. No.: 953,034

[22] Filed: Oct. 20, 1978

[30] Foreign Application Priority Data

Nov. 9, 1977 [JP] Japan .................... 52-133567

[51] Int. Cl.³ ............................. H02M 1/06
[52] U.S. Cl. ........................ 363/138; 363/96
[58] Field of Search ................... 363/27-28, 363/96, 135-138; 307/252 M

[56] References Cited

U.S. PATENT DOCUMENTS

| | | | |
|---|---|---|---|
| 3,465,233 | 9/1969 | Johnston et al. | 363/136 X |
| 3,688,182 | 8/1972 | Johnson | 363/138 |
| 3,766,468 | 10/1973 | Cardwell, Jr. | 363/136 |
| 3,984,751 | 10/1976 | Iwata et al. | 363/137 |
| 4,032,831 | 6/1977 | Nabae et al. | 363/41 X |

FOREIGN PATENT DOCUMENTS 42-15061 8/1967 Japan .

Primary Examiner—William M. Shoop
Assistant Examiner—Peter S. Wong
Attorney, Agent, or Firm—Stevens, Davis, Miller & Mosher

[57] ABSTRACT

The inverter comprises a plurality of branch circuits connected across a DC source. Each branch circuit includes a pair of main controlled semiconductor switching elements, a diode and a smoothing reactor which are connected between the pair of main controlled semiconductor switching elements. A commutating circuit including a commutating capacitor, a commutating reactor and an auxiliary reverse conduction type controlled semiconductor switching element is connected in parallel with each main controlled semiconductor switching element. A pair of circulating diodes are provided for each branch circuit and connected between respective commutating capacitors thereof and the positive and negative sides of the DC source.

6 Claims, 4 Drawing Figures

INVERTER APPARATUS

BACKGROUND OF THE INVENTION

This invention relates to inverter apparatus, more particularly inverter apparatus for producing a variable voltage, variable frequency polyphase alternating current output suitable for driving an alternating current motor from a direct current source.

FIG. 1 shows the main circuit of prior art inverter apparatus capable of controlling current by the inverter apparatus itself. The inverter apparatus comprises 6 sets of chopper circuits CH1 through CH6 which are constituted by 6 main thyristors M1 through M6, auxiliary thyristors A1 through A6 of the reverse conduction type and utilized for commutation, commutating reactors L1 through L6, and commutating capacitors C1 through C6. Main thyristors M1 and M4, and smoothing reactors LD1 and LD4 are connected in series across positive and negative bus lines of a DC source E. In the same manner, main thyristors M3 and M6 and smoothing reactors LD3 and LD6 are connected in series across the positive and negative bus lines, and main thyristors M5 and M2 and smoothing reactors LD5 and LD2 are also connected in series across the positive and negative bus lines. Phase selection and circulation thyristors S1 through S6 are connected between respective chopper circuits and the positive and negative bus lines. The AC output is derived out from output terminals U, V and W between smoothing reactors LD1 and LD4, LD3 and LD6 and LD5 and LD2 respectively. The main thyristors of respective chopper circuits are sequentially turned ON and OFF for 60 electrical angles at a timing shown in FIG. 2 by a control signal having a frequency of 1/6 of that of the output alternating current. The current is controlled by controlling the ratio of ON and OFF periods of the chopper circuits of the same phase during a chopper period of 60°. As it is possible to control the magnitude of the output current and the frequency thereof by the inverter apparatus itself the DC source may be a constant voltage source. Accordingly, where direct current is obtained from an AC source having a commercial frequency the rectifier can be constituted by diodes, whereby it is possible to improve the power factor of the source and to increase the speed of current control by choppers.

However, the inverter apparatus shown in FIG. 1 has the following defects. Namely, when the main thyristor M1 and the phase selection and circulating thyristor S1, for example, are OFF, the voltage at the U phase terminal is caused to become lower than the voltage of the negative bus bar by the induced voltage of a load motor, so that the commutation capacitor is overcharged by a circuit extending through auxiliary commutation thyristor of the reverse conduction type. Accordingly, it is necessary to increase the breakdown voltage of the auxiliary commutation thyristors and the main thyristors. Furthermore, each unit inverter requires a phase selecting and circulation thyristor in addition to the main thyristor and the auxiliary commutation thyristor, so that it is more expensive than a McMaley type inverter commutated by an auxiliary impulse.

SUMMARY OF THE INVENTION

Accordingly, it is an object of this invention to provide an improved current type inverter apparatus having the same advantage as the prior art inverter apparatus shown in FIG. 1 and can decrease the breakdown voltage of the main thyristors and the auxiliary commutation thyristors.

Another object of this invention is to provide an economical current type inverter apparatus by substituting the performance of the phase selecting and commutating thyristor by an auxiliary commutating thyristor and a circulating diode. Still another object of this invention is to provide an improved inverter apparatus wherein the commutating capacitor can readily be initially charged, the commutation period is not greatly influenced by the load current so that the inverter apparatus can produce high frequency alternating current.

According to this invention there is provided inverter apparatus comprising a plurality of branch circuits connected in parallel across positive and negative bus lines of a source of direct current, each branch circuit including a pair of main controlled semiconductor switching elements, a diode and a smoothing reactor which are connected in series between the pair of main controlled semiconductor switching elements, alternating current output terminals connected to points between respective pairs of the main controlled semiconductor switching elements, a plurality of commutating circuits respectively connected in parallel to the main controlled semiconductor switching elements, each commutating circuit including a commutating capacitor, a commutating reactor and a reverse conduction type auxiliary controlled semiconductor switching element which are connected in series, and a pair of circulating diodes provided for each branch circuit and connected between respective commutating capacitors thereof and the positive and negative bus lines respectively.

DESCRIPTION OF THE PREFERRED EMBODIMENTS

Figure 1:
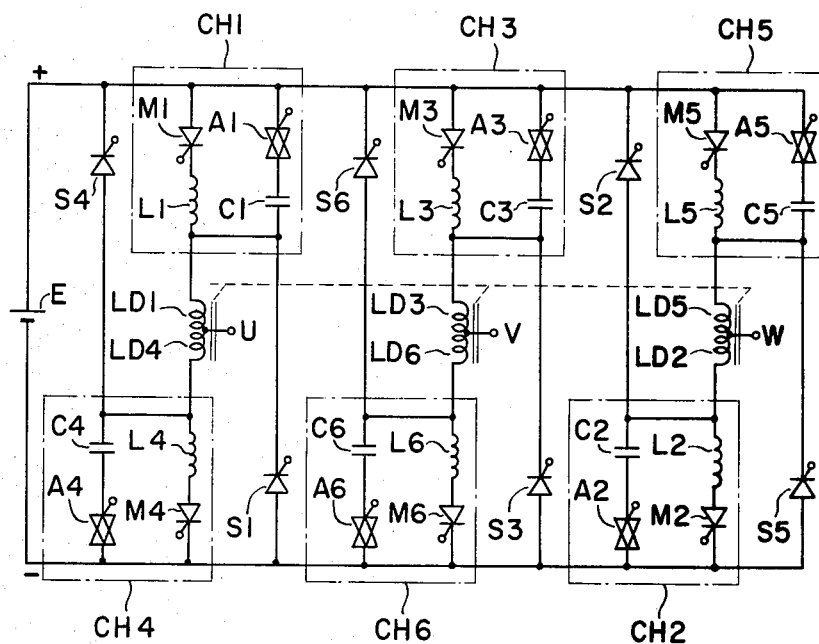
FIG. 1 is a schematic connection diagram showing a prior art inverter apparatus.
Figure 2:
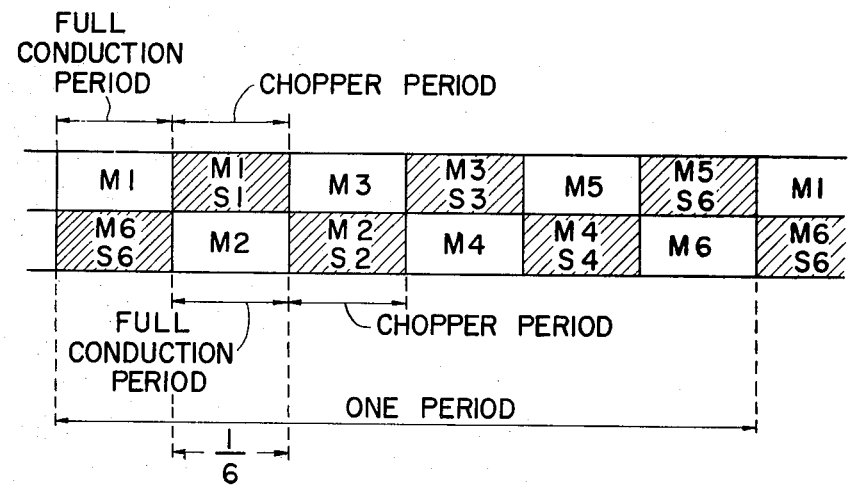
FIG. 2 is an ignition timing chart of the inverter apparatus shown in FIG. 1.
Figure 3:
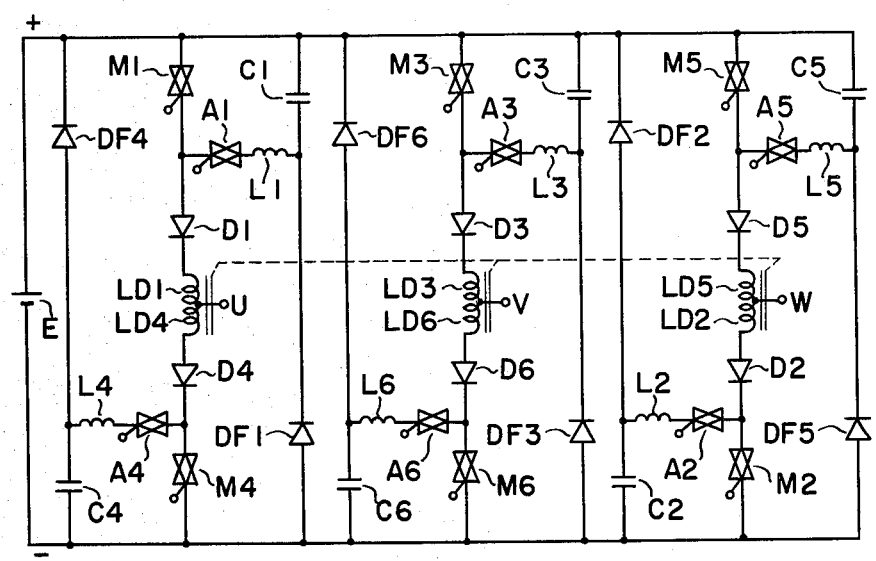
FIG. 3 is a schematic connection diagram showing one embodiment of this invention.

In FIG. 3 showing one embodiment of this invention circuit elements corresponding to those shown in FIG. 1 are designated by the same reference characters. Thus, M1 through M6 designate reverse conduction type main thyristors, and A1 through A6 reverse conduction type thyristors adapted to act as commutation thyristors and to selectively form circulating circuits. The cathode electrode of the commutation thyristor A1 is connected to the cathode electrode of the main thyristor M1, while the anode electrode of thyristor A1 is connected to one terminal of a commutating reactor L1 having opposite terminal connected to commutating capacitor C1, thus forming a commutating circuit between the positive bus line and the thyristor A1. Each of the circulating diodes DF1 through DF6 is connected between the juncture between a commutating capacitor and a commutating reactor, and the negative or positive bus line. Diodes D1 through D6 are provided for the purpose of preventing reverse conduction of the reverse conduction type commutating thyristors at undesirable times and connected in series with smoothing reactors LD1 through LD6, respectively, which are magnetically coupled as shown by dotted lines. The midpoints U, V, W constitute output terminals for deriving out three phase alternating current.

The operation, particularly the commutating operation of the inverter apparatus of this invention is as follows. During the chopper (or conduction) period of the main thyristor M1, current flows from the DC source E through positive bus line, main thyristor M1, series diode D1, smoothing reactor LD1, output terminal U, U and W phases of the load, output terminal W, smoothing reactor LD2, series diode D2, main thyristor M2 and the negative bus line. At this time, commutating capacitor C1 is charged to the same voltage as the source E with a polarity shown in the drawing. To render OFF the main thyristor M1, the commutating thyristor A1 is turned ON or ignited. Then, the charge of the commutating capacitor C1 is discharged through thyristors M1 and A1 and the discharge current is caused to take the form of an oscillation current by the oscillation circuit constituted by capacitor C1 and reactor L1. When the reverse current flowing through the oscillation circuit exceeds the load current, the main thyristor conducts in the reverse direction to pass the reverse current. When the reverse current reaches its maximum value and then reduces to a value equal to the load current, the main thyristor turns OFF. Thereafter, the load current flows through a circuit including the positive bus line, commutating capacitor C1, commutating reactor L1 commutating thyristor A1, and series diode D1. By this current, the commutating capacitor is charged to a polarity opposite to that shown and when the voltage of the capacitor becomes equal to the source voltage the circulating diode DF1 becomes conductive so that the load current now flows through a circulating path including the negative bus line, circulating diode DF1, commutating reactor L1, commutating thyristor A1, series diode D1, smoothing reactors LD1, LD2, series diode D2, main thyristor M2 and the negative bus line thus completing the commutation of main thyristor M1. When the main thyristor M1 is turned ON again, the polarity of the commutating capacitor C1 is reversed to that shown in the drawing by the oscillating current, and the circulating current described above is transferred to the main thyristor M1, the building up (di/dt) of the commutating current being suppressed by the commutating reactor L1, thus returning to the firstly described circuit condition in which energy is injected into the load from the DC source E. Thus, the magnitude of the load current can be controlled as desired by suitably controlling the time ratio of the energy injection mode to the circulation mode. Where the load comprises an AC motor which generates a counter electromotive force and can act as a generator, the current increases during the circulation mode, so that when the main thyristor M2 is turned OFF by turning ON the commutating thyristor A2, the load current would flow between the negative and positive bus lines through a circuit including diode DF1, commutating reactor L1, commutating thyristor A1, series diode D1, smoothing reactor LD1, the load, smoothing reactor LD2, series diode D2, commutating thyristor A2, commutating reactor L2, circulating diode DF2, thus regenerating the power to the source. The regeneration current can be controlled by controlling the time ratio between the regeneration mode and the circulation mode in the same manner as the above described energy injection mode.

The manner of transferring the phase of the load which passes current for the purpose of controlling the load frequency will now be described. While current is supplied to phase U of the load through main thyristor M1 and series diode D1, the main thyristor M1 is turned OFF to establish the circulation mode. Then, during the chopper period the main thyristor M1 is turned ON again but during the commutation period the main thyristor M3 is turned ON instead of main thyristor M1.

Since smoothing reactors LD1 and LD3 are closely coupled together, the voltage of the DC source E is impressed across the phases U and V with phase V positive and phase U negative, whereby the current begins to transfer from phase U to phase V. Thus, the interphase commutation completes when the current through phase U becomes zero.

While in the foregoing description, the ON, OFF operations of the main thyristor M1 during the chopper period and the commutation of the load current from phase U to phase V were described it will be clear that the other main thyristors are sequentially operated in the same manner.

Although in the embodiment shown in FIG. 3 reverse conduction type thyristors were used as the main thyristors M1 through M6 and the commutating thyristors A1 through A6 it is also possible to use combinations of ordinary thyristors that prevent reverse flow and diodes. Furthermore, the main thyristors may comprise only ordinary thyristors that prevent reverse flow. In this case, the turn OFF operation of the main thyristors becomes slightly different. For example, when the commutating thyristor A1 is turned ON for the purpose of turning OFF the main thyristor M1, the charge of the commutating capacitor C1 passes oscillating current through the main thyristor M1. When the oscillating current that flows through the main thyristor in the reverse direction becomes equal to the load current, the main thyristor M1 turns OFF. Thereafter, the load current flows from the positive bus line through commutating capacitor C1, commutating reactor L1, commutating thyristor A1, and series diode D1 thereby charging the commutating capacitor C1. When the voltage of the commutating capacitor C1 becomes equal to the voltage of the DC source E the circulation diodes turns ON to establish the circulation mode.

The other commutating operations are the same as those of the previous embodiment utilizing the reverse conduction type main thyristors.

Instead of connecting the commutating reactor L1 between the commutating thyristor A1 and the commutating capacitor C1, it may be connected between the main and the commutating thyristors, or between the main thyristor and the commutating capacitor.

In the embodiment shown in FIG. 3, the initial charging of the commutating capacitor for the purpose of starting the inverter apparatus is performed in the following manner. Thus, during the OFF period of the main thyristor it is sufficient to charge the commutating capacitor to the voltage of the DC source E with a polarity opposite to that shown in the drawing so that such initial charging can be effected by merely connecting an initial charging resistor in parallel with each of the circulating diodes DF1 through DF6.

Instead of providing the initial charging resistors a starting preparation sequence may be used to charge the commutating capacitor. For example, the commutating thyristor A1 and the main thyristor M4 may be turned ON to charge the commutating capacitor C1. The other commutating capacitors can also be charged in the same manner.

With regard to the arrangement of the smoothing reactors LD1 through LD6 and the method of deriving out the load terminals, one pair comprising reactors LD1, LD3 and LD5 and the other pair comprising reactors LD2, LD4 and LD6 may be wound on independent cores as has been the practice or either one of the pairs of the reactors may be omitted. When the output of the inverter apparatus is supplied to two independent loads, the output may be derived out from opposite terminals of the smoothing reactors to improve the utilization factor of the smoothing reactors.

Figure 4:
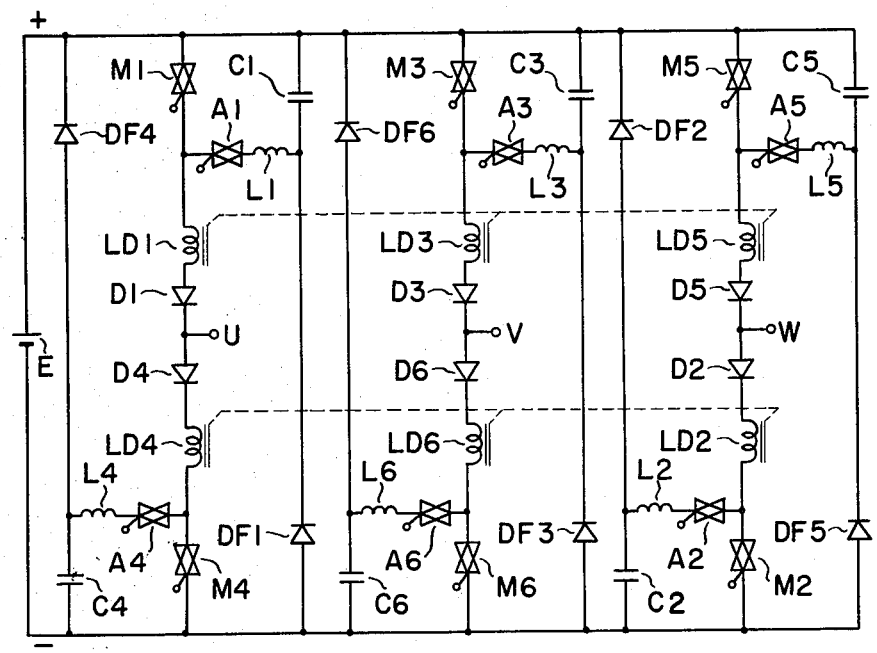
FIG. 4 is a schematic connection diagram showing a modified embodiment of this invention.

FIG. 4 shows a modified embodiment of this invention in which diodes D1, D4; D3, D6 and D5, D2 are connected in series respectively between smoothing reactors LD1 and LD4, between reactors LD3 and LD6 and between reactors LD5 and LD2 and the output terminals U, V and W are connected between diodes D1 and D4; D3 and D6 and D5 and D2 respectively. In this case too either one pair of diodes and smoothing reactors may be omitted.

As above described different from the prior art current type inverter utilizing series diodes in which current is controlled by the inverter apparatus itself, in the inverter apparatus of this invention it is not necessary to control the voltage of the direct current source so that the direct current source may be a simple diode rectifier which is connected to a source of alternating current of commercial frequency. Accordingly, the inverter apparatus of this invention is advantageous in that the power factor of the source is high, that the initial charging of the commutating capacitor is easy, that the commutation is not greatly affected by the magnitude of the load current, that it is suitable to operate at high frequencies, that the output waveform can be improved readily, that the control can be effected rapidly, that the commutating voltage is always constant thereby assuring accurate commutation, that the commutating capacitor is not overcharged thus decreasing the breakdown voltage required for the main thyristors and the commutating thyristors, and that the number of thyristors is relatively small, that is only one commutating thyristor is necessary for each main thyristor.

It should be understood that thyristors may be substituted by any other suitable controlled semiconductor switching elements.

I claim:

1. Inverter apparatus comprising a plurality of branch circuits connected in parallel across positive and negative bus lines of a source of direct current, each branch circuit including a pair of main controlled semiconductor switching elements comprising reverse conduction type thyristors, diode means and smoothing reactor means connected in series between said pair of main controlled semiconductor switching elements, alternating current output terminals connected to points between respective pairs of said main controlled semiconductor switching elements, a plurality of commutating circuits respectively connected in parallel to said main controlled semiconductor switching elements, each commutating circuit including a commutating capacitor, a commutating reactor and a reverse conduction type controlled semiconductor switching element which are connected in series, and a pair of circulating diodes provided for each branch circuit and connected between respective commutating capacitors thereof and said positive and negative bus lines respectively.

2. The inverter apparatus according to claim 1 wherein the smoothing reactors of said plurality of branch circuits are magnetically coupled with each other.

3. The inverter apparatus according to claim 1 wherein said semiconductor switching elements of the commutating circuits comprise reverse conduction type thyristors.

4. The inverter apparatus according to claim 1 wherein each branch circuit comprises a pair of reverse conduction type main thyristors respectively connected to said positive and negative bus bars, a first diode, a smoothing reactor, and a second diode which are connected in series between said main thyristors in the order mentioned, and an output terminal connected to a midpoint of said smoothing reactor.

5. The inverter apparatus according to claim 1 wherein each branch circuit comprises a pair of reverse conduction type main thyristors respectively connected to said positive and negative bus lines, a first smoothing reactor, a first diode, a second diode, and a second smoothing reactor which are connected in series between said main thyristors in the order mentioned.

6. A voltage inverter for producing a multiple phase alternating current from a DC voltage in response to a plurality of switching signals comprising:
means for providing a DC voltage comprising first and second bus lines of opposite polarity;
a plurality of smoothing reactors each having a first terminal for supplying a current to a load, and second and third terminals for being switchably connected with said first and second bus lines;
a plurality of switching devices operating in response to said switching signals for connecting said second terminals to said first bus line and said third terminals to said second bus line, each of said switching devices comprising a first diode having one end connected to one of the second or third terminals of a respective smoothing reactor, a main thyristor connecting the remaining end of said diode with a respective bus line, said main thyristor providing a current to a load connected to the first terminal of a respective smoothing reactor when enabled by said switching circuit; means for interrupting the current flow in said main thyristor comprising: an auxillary thyristor serially connected to the remaining end of said diode and one side of an inductor; a capacitor connecting the remaining side of said inductor with the respective bus line whereby said capacitor supplies a current for interrupting the current flow in said main thyristor; and a second circulating diode connected between the remaining side of said inductor and the remaining bus line.

* * * * *